(No Model.)

J. L. DELAPLAINE, J. G. HENDRICKSON & F. J. CLAMER.
REMOVING TIN FROM TIN SCRAP BY ELECTRICITY.

No. 282,964.                  Patented Aug. 14, 1883.

Witnesses
John F. Bilsterling
Fredk J. Lambert

Inventors
James L. Delaplaine
Joseph G. Hendrickson
Francis J. Clamer
by their attorney
Thomas D. Morolds

UNITED STATES PATENT OFFICE.

JAMES L. DELAPLAINE, JOSEPH G. HENDRICKSON, AND FRANCIS J. CLAMER, OF PHILADELPHIA, PENNSYLVANIA.

REMOVING TIN FROM TIN-SCRAP BY ELECTRICITY.

SPECIFICATION forming part of Letters Patent No. 282,964, dated August 14, 1883.

Application filed November 6, 1882. (No model.)

*To all whom it may concern:*

Be it known that we, JAMES L. DELAPLAINE, JOSEPH G. HENDRICKSON, and FRANCIS J. CLAMER, citizens of the United States, residing at Philadelphia, in the county of Philadelphia and State of Pennsylvania, have invented certain new and useful Improvements in Removing Tin from Tin-Scrap by Means of Electricity; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of our invention is to remove the tin, lead, and other metals from the surface of refuse and scrap tin and terne-plate, galvanized iron, &c., by heat generated by the aid of a dynamo-electric machine. Heretofore it has been impossible to cheaply and thoroughly remove this tin, &c., and the scrap has either been cast aside as worthless, or melted down with the tin, &c., only partially removed. The iron thus obtained from the imperfectly-cleaned scrap is extremely hard and brittle, fit only for the most common and ordinary purposes—such as sash-weights, &c. If the tin is thoroughly removed before melting the iron, a very superior quality of metal is produced, as tin-plate is always made from the best grades of charcoal-iron.

Figure 1:
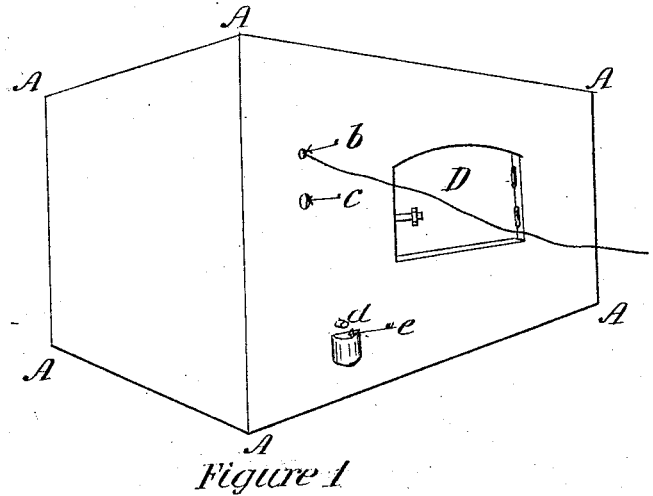
Figure 2:
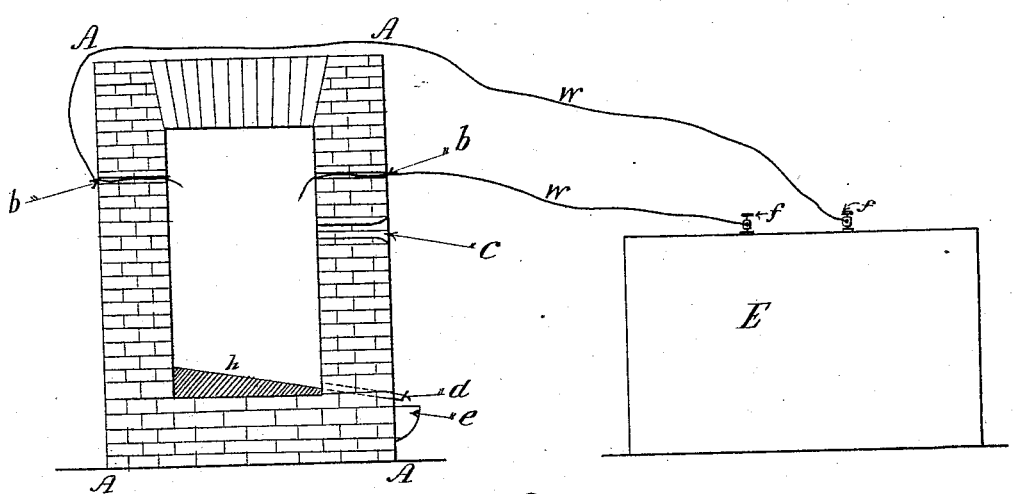

In the accompanying drawings, in which similar letters of reference indicate like parts, Figure 1 shows a view, in perspective, of a furnace constructed of fire-brick or any suitable substance that is a non-conductor of electricity. This furnace may be of any form and of any desired or convenient size. Fig. 2 shows a cross-section of the furnace connected with a dynamo-electric machine.

A A A A is the fire-brick furnace. D is the door or opening through which the charge is introduced into the furnace. *b b* are small apertures through which the wires W W are inserted to connect with the metal. C is a glass sight or peep-hole, by means of which a view of the metal is obtained in order that the temperature may be properly regulated. *h* is an inclined hearth in the furnace. *d* is a small opening to convey the melted tin from the furnace; *e*, a small receptacle to receive the melted metal as it comes from the opening *d*. E represents an ordinary dynamo-electric machine. *f f* are the positive and negative poles of the machine.

The operation of removing the tin is as follows: The furnace is filled with the scrap and the wires W W are passed through the openings *b b*, so as to connect with the contents of the furnace. This completes the circuit, and the machine is then put in operation instantly. The whole mass of metal is heated to any desired temperature, and the tin or lead is melted and drops on the inclined hearth *h*, passing from thence through the opening *d* to the receptacle *e*. To remove the surface metal thoroughly, the battery is regulated so as to keep the iron at a bright red heat, and any tin, &c., that will not flow off in a metallic form is converted into an oxide, and can readily be recovered in the usual way. After the tin has been thus melted from the iron, the charge of metal is removed through the door D, and a new one introduced. Should it be desirable to more effectually insulate the furnace, it may be placed upon a glass foundation.

We are aware that various processes are or have been heretofore in use for the recovery of zinc, tin, lead, &c., from scrap metals; that highly-heated air and hot air and steam have been used; that the metals have been heated in muffles exposed in furnaces, and that electricity has been used where the metals were placed in close furnaces in crucibles surrounded by an external metallic or other conductor, and the heat communicated indirectly, and we therefore disclaim any and all of these methods.

Having thus described our invention, what we claim as new, and desire to secure by United States Letters Patent, is—

The herein-described method of removing tin and other metals from scrap-tin, plate, &c., by placing the scrap metal in an insulated fire-chamber in a suitable furnace, and heating it by a current of electricity, the metal being directly in the circuit, substantially as shown and described.

In testimony whereof we affix our signatures in presence of two witnesses.

JAMES L. DELAPLAINE.
JOSEPH G. HENDRICKSON.
FRANCIS J. CLAMER.

Witnesses:
JOHN W. BAUM,
THOS. D. MOWLDS.